(12) United States Patent
Hesch

(10) Patent No.: US 6,561,562 B1
(45) Date of Patent: May 13, 2003

(54) MOTOR VEHICLE WITH HEAT INSULATION

(75) Inventor: Rolf Hesch, Lemgo (DE)

(73) Assignee: Moller Plast GmbH, Bielefeld (DE)

( * ) Notice: Subject to any disclaimer, the term of this patent is extended or adjusted under 35 U.S.C. 154(b) by 0 days.

(21) Appl. No.: 09/242,340

(22) PCT Filed: Aug. 12, 1997

(86) PCT No.: PCT/DE97/01710

§ 371 (c)(1),
(2), (4) Date: Feb. 12, 1999

(87) PCT Pub. No.: WO98/06601

PCT Pub. Date: Feb. 19, 1998

(30) Foreign Application Priority Data

Aug. 13, 1996 (DE) .......................................... 196 32 550

(51) Int. Cl.[7] .............................................. B62D 33/00
(52) U.S. Cl. ...................... 296/39.3; 296/208; 296/901
(58) Field of Search ............................... 296/39.3, 208, 296/141.6, 211, 39.1, 901; 280/751

(56) References Cited

U.S. PATENT DOCUMENTS

| | | | |
|---|---|---|---|
| 2,768,672 A | | 10/1956 | Doormann |
| 3,274,915 A | * | 9/1966 | Ziegenfelder ............... 296/208 |
| 3,324,968 A | | 6/1967 | De Castelet |

(List continued on next page.)

FOREIGN PATENT DOCUMENTS

| | | | | |
|---|---|---|---|---|
| DE | 2 006 741 | | 9/1971 | |
| DE | 24 36 219 | | 2/1976 | |
| DE | 4001947 | * | 8/1990 | ................. 280/751 |
| DE | 39 32 121 | | 4/1991 | |
| DE | 41 23 593 | | 1/1993 | |
| DE | 1 480 299 | | 7/1999 | |
| EP | 0 071 914 | | 2/1983 | |
| EP | 0 363 130 | | 4/1990 | |
| EP | 0 511 157 | | 10/1992 | |
| EP | 0 571 640 | | 12/1993 | |
| GB | 1441598 | * | 7/1976 | ................. 280/751 |
| GB | 2 213 097 | | 8/1989 | |
| GB | 2 216 081 | | 10/1989 | |
| JP | 0142760 | * | 11/1981 | ................. 296/39.3 |
| JP | 0155165 | * | 9/1982 | ................. 296/39.3 |
| WO | 93 11001 | | 6/1993 | |

OTHER PUBLICATIONS

Patent Abstract of Japan, Publication No. 07323792, Publication Date Dec. 12, 1995, Inventor Nagaki Shunsuke, "Manufacture of Insulator Dash for Automobile".

*Primary Examiner*—Dennis H. Pedder
(74) *Attorney, Agent, or Firm*—Browdy and Neimark

(57) ABSTRACT

The interior of the passenger compartment of a motor vehicle is provided on its outer limiting surfaces with heat insulating materials, preferably to such an extent that a complete heat insulation is achieved. Such a complete heat insulation makes considerable and weight and energy savings possible when using heating and/or air conditioning systems in vehicles, and a corresponding reduction of pollutant emissions. The ecological effect of this measure is particularly reinforced if renewable raw materials are used as heating insulation materials, either alone or combined with plastics into composite materials in the individual areas of the motor vehicle. By appropriately designing and sizing the heat insulating measures, they can also lead to additional improvements are regards weight, mechanical stability and sound insulation, besides the actual heat insulating effect, substantially improving the usability and ecological compatibility of the motor vehicle.

22 Claims, 6 Drawing Sheets

U.S. PATENT DOCUMENTS

| | | | |
|---|---|---|---|
| 3,366,026 A | * | 1/1968 | Herr et al. ............... 296/211 X |
| 3,868,796 A | * | 3/1975 | Bush ................... 296/146.6 X |
| 4,584,225 A | * | 4/1986 | Adelman .................... 296/901 |
| 4,783,114 A | * | 11/1988 | Welch ........................ 280/751 |
| 4,801,169 A | * | 1/1989 | Queen et al. ............... 296/39.1 |
| 4,830,908 A | | 5/1989 | Nakajima et al. |
| 5,007,976 A | * | 4/1991 | Satterfield et al. .......... 156/122 |
| 5,064,714 A | | 11/1991 | Yamaguchi et al. |
| 5,111,619 A | * | 5/1992 | Billin et al. ............... 296/39.1 |
| 5,205,781 A | * | 4/1993 | Kanno et al. ................ 454/164 |
| 5,395,135 A | | 3/1995 | Lim et al. |
| 5,529,824 A | | 6/1996 | Walendy |
| 5,567,922 A | | 10/1996 | Schmuck et al. |
| 5,595,415 A | * | 1/1997 | Beaulat ...................... 296/39.1 |
| 5,806,919 A | * | 9/1998 | Davies ................... 296/187 X |
| 5,817,408 A | * | 10/1998 | Orimo et al. ............... 428/218 |
| 5,934,737 A | * | 8/1999 | Abouzahr ................ 296/146.6 |
| 5,997,077 A | * | 12/1999 | Siebels et al. ....... 296/146.6 X |

\* cited by examiner

MOTOR VEHICLE WITH HEAT INSULATION

This application is the national phase of international application PCT/DE997/01710 filed Aug. 12, 1997 which designated the U.S.

BACKGROUND OF THE INVENTION

Large efforts are being made in connection with vehicle manufacturing, in particular passenger car manufacturing, to reduce fuel consumption in order to relieve the environment by means of reduced emissions. A reduction in fuel consumption is presently being primarily sought by reducing the weight of vehicles.

Parallel with this, on the other hand, all manufacturers of vehicles intensely strive to design their vehicles safer, in order to reduce the accident risk for the occupants, and this often results in a weight increase because of additional components, for example the installation of transverse rails in the doors and struts in the vehicle cage. The additional weight these entail cannot even remotely be compensated by savings in the interior fittings.

Because of the employment of smaller engines with improved efficiency it becomes increasingly necessary to install auxiliary heaters, especially in vehicles of smaller size and medium size, because smaller engines and improved engine efficiency no longer provide enough waste heat for heating the vehicles sufficiently in winter.

In a further, parallel occurring development, vehicles are being equipped more and more luxuriously in order to gain advantages in the goodwill of the buyer. The standard equipment of vehicles with air conditioners even in the smaller and medium sizes increases at a steep rate.

Because of the increased employment of auxiliary heaters and air conditioners, the gains regarding the reduction in fuel consumption and emissions, which have often been achieved by painful attention to structural details, have all of a sudden been lost.

On the average, air conditioners weigh 15 to 16 kg, i.e., by far more than can ever be saved in components of the interior fittings. Added to this is that air conditioners cause an average fuel increase of 0.6 l per 100 km. If an air conditioner is installed, both the weight savings at other locations as well as the reduced consumption achieved by this are completely or mostly lost. Driving comfort is increased, but consumption and environmental stress are increased.

Auxiliary fuel heaters weigh 2 to 4 kg on the average and consume 0.2 to 0.4 l of fuel per hour. Passive auxiliary heaters, which recover heat from the waste air of the passenger compartment by means of a heat pump, desorption heaters, and the like are limited in their output, most are heavier than auxiliary fuel heaters and because of the use of electric energy are neither more efficient and in particular not more ecological.

Surprisingly and in a way hard to understand, parallel developments therefore take place in the manufacture of passenger cars each of which, when examined by itself, can be considered to be an improvement, but which as a whole mutually cancel each other partially out in regard to their ecological consequences. The total balance is rather disappointing.

From the viewpoint of ecology, the strong trend toward air conditioners in particular is a serious backward step. It leads to a considerable increase in fuel consumption and therefore to increased emissions of noxious matter. This becomes clear, inter alia, from the recent demands, even from the automobile club sector, to require the manufacturers of vehicles to openly disclose among the technical vehicle data the increase of fuel as a result of the use of air conditioners, so that the buyer can clearly see what additional operating costs he will have to reckon with in connection with air conditioners, and most of all how he has to pay for the luxury of an air conditioner with additional stresses on the environment.

A vehicle in accordance with the species is known from U.S. Pat. No. 2,768,672, which has a partial thermal insulation, which consists of the attachment, or respectively the connection, of asbestos mats with "surfaces of the interior bordering the exterior" and which is limited to this. The intended thermal insulation in this known solution must be paid for with disadvantages (for example higher weight because of the asbestos mats), which neutralize at least a portion of the advantages of thermal insulation.

BRIEF SUMMARY OF THE INVENTION

The invention has as its object the achievement of reduced energy consumption of, and therefore reduced emissions of noxious material by, motor vehicles. This is to be achieved in particular when additional measures for heating and/or air conditioning cannot or should not be omitted which, for the above stated reasons, result in a considerable worsening of the total ecological balance of the system called "vehicle".

For achieving this goal, it is intended in accordance with the invention to intensively thermally insulate vehicles, in particular those parts in which the passengers are, and expanded areas of the vehicle in which thermal insulation is possible in accordance with their structure and function, for example trunks, cargo compartments, and the like. Thermal insulation in the sense of the present application is to be understood to mean that portions of the vehicle which border it on the outside, such as doors, tops, floor components, door sills, pillars, transverse and longitudinal supports, trunk enclosures and the like are to be provided with thermally insulating layers or thermally insulating molded parts as insulating bodies to the extent that this is constructively possible.

Further than that, in accordance with the invention it is intended to design the thermal insulation component-specifically and to employ it in this way, so that its use as "only thermal insulation" can be far exceeded in that the remaining properties of the respective components are also improved, as will be represented in detail in what follows:

Initially it is prevented that in summer heat can flow, scarcely stopped, into the interior, in particular into the passenger compartment which would, if air conditioning were to be installed, require a correspondingly large cooling capacity. The expense of thermal insulation is very much less than that for an air conditioner, and so is the weight. In contrast to an air conditioner, it does not cause any operating costs and especially no emissions.

As a rule, an effective thermal insulation will obviate the installation of air conditioners in vehicles in the lower and medium price range, or at least a much smaller installation will be sufficient. With vehicles where it is not possible to omit an air conditioner in spite of thermal installation, an air conditioner with a fraction of the cooling capacity will be sufficient. Naturally, smaller air conditioner use up less energy and cause proportionally reduced emissions. Also, weight is saved with them, which results in further energy savings.

Thermal insulation which reduces the penetration of heat in the summer also prevents the loss of heat in the winter. Vehicles can be kept warm in winter with a reduced use of energy. The amounts of waste heat, which become increasingly less, are then sufficient to heat the vehicles. The auxiliary heaters can be omitted to a large extent, or at least those with less heat output will be sufficient. In this case, too, weight as well as fuel is saved. Fuel is saved even in a twofold manner, namely for the generation of heated air itself, as well as for driving the increased weight or the auxiliary heater.

Thermal insulation can be provided to a large extent by the use of renewable raw materials. Therefore these should be preferably used. Renewable materials do not cause emissions, but the opposite instead. In the course of their assimilation, $CO_2$ already present in the air is reduced and oxygen is released. All possibilities of insulating material, or respectively insulating body designs, can be used by the combination with binding agents and foams made from synthetic plastic materials, derivations of natural materials and/or biogenous materials.

Effective thermal insulation also automatically results in an important addition to improved traffic safety: as determined by a study by TÜV [Technical Inspection Service], a temperature increase in the vehicle from 25° C. to 35° C. reduces the fitness of a driver in traffic to the same degree as a blood alcohol content of 0.5 per thousand.

Combined with reinforcement and/or planking elements, for example by means of sheet metal, thermal insulating materials in the form of insulation bodies can also result in considerable mechanical protection and can completely or partially replace the metal rails, which of late have been installed in vehicle doors for improving side impact protection.

The omission of the rails also saves weight. Thus, the replacement of the rails by rigid and energy-dissipating thermal insulation elements, together with the outside and inside sheet metal panels of doors, can take place without significant weight increase, a weight reduction might possibly be conceivable; a complete foam filling of, for example, vehicle doors for the purpose of thermal insulation already demonstrably increases the moment of resistance of the door considerably in comparison with a hollow door as is being constructed in accordance with the prior art. In the course of tests, the reinforcement of the thermal insulating foams by fibers, yarns, stalks, non-wovens, fabrics and similar structures, preferably made of renewable raw materials, has resulted in a further considerable increase in strength. Even when reducing the sheet metal thickness by half, it was possible to achieve strength values which lay far above those in accordance with the prior art, and this even with a reduced total weight.

A thermal insulation in the way shown above with additional reinforcement steps also achieves safety functions in a dual manner: even without air conditioners, or with low cooling capacities, it is possible to maintain the interior climate of vehicles in ranges, which are helpful to the driving fitness of the driver. In the case of a crash, the vehicles provided with thermal insulation in the described manner offer great sturdiness and a large ability for absorbing impact energy. Said thermal damping elements also do not splinter into sharp edges.

Further advantages of the said thermal insulating elements reside in acoustic insulation. A low noise level in the vehicle, besides a pleasant temperature, is a further prerequisite for a very good driving fitness of the driver. He does not get tired as quickly and is less stressed by nerves. Already, some vehicle manufacturers reduce the interior noise generation in particularly critical zones by means of felt. Separate acoustic insulation measures are superfluous in an intensely thermally insulated vehicle, since thermal insulation designed in this manner also increases acoustic insulation as an intentional or unintentional side effect.

Thermal insulation measures taken in accordance with the invention permit the reduction of the thickness of the body sheet metal without loss in strength, especially if the thermal insulation elements are fixedly connected with the body sheet metal, for example by foaming or adhesion. Insulating elements, in particular those reinforced in the described manner, can partially assume supporting functions in the place of sheet metal—a considerable contribution to easier recycling and better ecology.

Besides the above mentioned tendencies, which are counterproductive from an ecological point of view, the developments in vehicle construction also show a tendency toward "vehicle modules". For example, in the future a door should no longer be delivered in many individual parts by different suppliers to the passenger car manufacturer and only be assembled there, but should be delivered completely as a "module", so that it only need to be hung. Thermal insulation elements produced in the described manner can, if they are reinforced in accordance with the invention, take on the functions of a support of functional elements, for example window lifts, door locks, etc., in addition to thermal insulation and accident protection, and with a decorative interior can replace the interior paneling of the old style as decorative single purpose elements, so that to this extent the solution in accordance with the invention also takes this development into account.

BRIEF DESCRIPTION OF THE SEVERAL VIEWS OF THE DRAWING

A preferred exemplary embodiment of the concept of the invention will be represented by means of the examples in FIGS. 1 to 4; shown are in.

DETAILED DESCRIPTION OF THE INVENTION

Figure 1:
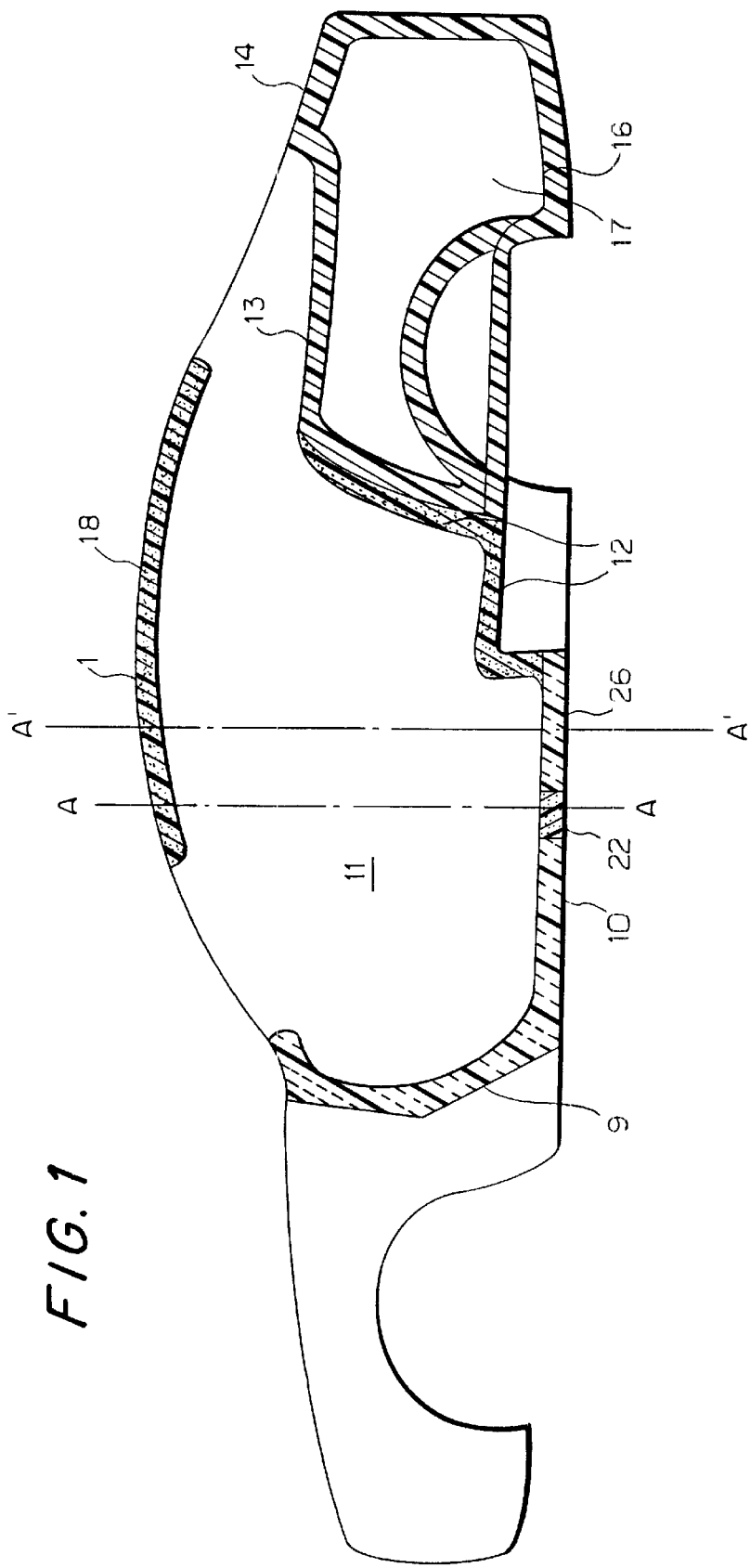
FIG. 1, a longitudinal sectional view through a motor vehicle body with areas of thermal insulation, FIG. 2, a cross section in the plane A—A, or respectively A'—A' through the motor vehicle body in FIG. 1, FIG. 3, a vertical sectional view through a motor vehicle door with thermal insulation in accordance with the invention, and FIGS. 4A, 4B, two cross-sectional views through a motor vehicle top with interior ventilation.
Figure 2:
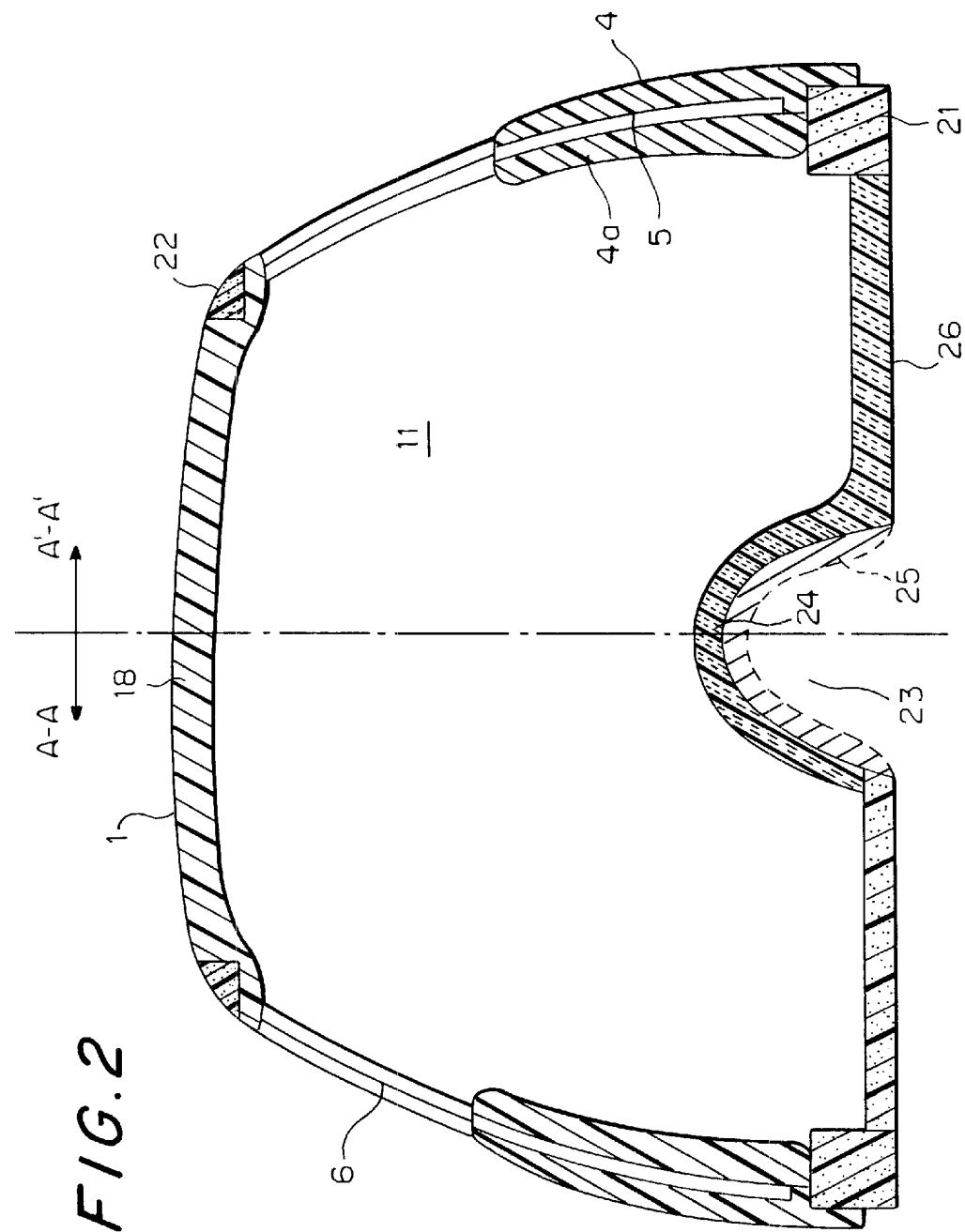

By means of FIGS. 1 and 2 it is intended to individually consider the essential structural areas of the motor vehicle which are provided with a thermal insulation in accordance with the invention:

In this connection it is basic that, depending on the functions and specific loads on each one of these areas, it is possible to select a thermal insulation (either as an insulating body of a preselected shape, or as a thermal insulating material, whose shape is only created during/after its application on an associated component, for example by foam application/heating which, because of its further properties, even complements and improves the basic function of the associated component; thus, novel functioning units with qualitatively improved properties, not only in respect to the desired thermal insulation, but also in respect to mechanical strength, acoustic insulation, weight reduction, etc. are created by means of the integration of the respective thermal insulating material.

(a) There are often hollow spaces in the body, which are located between the interior and the outer sheet metal 1, examples of this to be mentioned here are the rails 22, door sills 21, and the area between the inner and outer wheel well.

Here, thermal insulation is ideally achieved by foam application. Only a small opening in the respective hollow space is needed for inserting the insulating material in liquid form. Curing, or respectively polymerization, of the plastic material used, for example polyurethane, only takes place after this. With many plastic materials, the start of foaming can be initiated from the outside, for example by first placing unfoamed contoured pieces into the hollow space, which are then caused to foam up by the effects of heat.

(b) Insulating material is selected in the area of the instrument panel and the feet 9 which, besides good thermal insulation properties, also has resilient and/or shock-absorbing properties, in order to reduce the danger of head or knee injuries in particular to the driver and front seat passenger in case of an accident.

While mostly rigid preformed elements are provided as insulating bodies for thermal insulation in the area of the instrument panel, in the area underneath the instrument panel 9 the foam application of a thermal insulating material or the gluing-on of resilient insulating mats is also conceivable. In any case, it is important that the insulating material is fixedly connected with the sheet metal in front of it, for example is glued to it. Only in this way is it possible to achieve optimal energy dissipation in case of an impact.

In this area 9, which borders the engine compartment, the thermal insulation can also provide a contribution to acoustic insulation, for example by a suitable profiling (egg carton profile) toward the engine compartment.

(c) In the floor area 10 a material, for example a composite material, has been selected for thermal insulation, which has a hard surface capable of resistance, since this area is greatly mechanically stressed, particularly because of entering and leaving.

(d) If the rear area 12 of the passenger compartment is to be thermally insulated in respect to the trunk 17, it is recommended to integrate a suitable insulating body in the seat, or respectively the backrest. This can be done in such a way that the panels made of a thermal insulation material, for example a composite of natural fibers or also styrofoam, are worked into the seat, or respectively backrest 12, or that the seat and/or the backrest 12 are made of self-supporting, insulating preformed insulating elements.

The rear window shelf 13 is preferably produced as a self-supporting plastic or rigid expanded polyurethane element of sufficient thickness. Although such components have already been made of expanded foam and composite materials, this was done in view of the weight savings which could be achieved by this along with sufficient stability. The thermal insulating effect achieved by means of this is therefore negligible in actual use, in particular because of the too small portion of these surfaces on the outer surface of the passenger compartment.

(e) In the area of the underbody 26 and the transmission tunnel 23, a thermal insulation 25 is also provided on the outside besides the thermal insulation 24 on the inside (see (b) and (c)). This can be achieved, for example, by foaming impact-resistant plastic onto the entire underbody group. The application of one or several preformed elements is also conceivable. In addition to thermal insulation, protection of the underbody 26 against salt, thrown rocks, etc. is also achieved. In case preformed elements are used for thermal insulation, it is conceivable to make them in the form of easily replaceable "wear elements" because of the high mechanical stresses to which they are exposed. In this case care should be taken in particular that a good recycling ability of the used insulating material is provided.

(f) For the thermal insulation of the areas 14 bordering the trunk 17, preformed elements made of a hard plastic are provided. For example, the trunk lid can be insulated by means of an insulating body made of foam material.

In vans, station wagons and similar types of motor vehicles, the cargo compartment takes the place of the trunk, which then can be correspondingly included in the total insulating measures. The importance of the trunk, or respectively of the cargo compartment for thermal insulation lies in an "enlargement" of the passenger compartment by including this volume in the ventilating and/or air conditioning system of the motor vehicle, because of which the oxygen supply can be increased, the supply of exterior air reduced and in this way the thermal insulation balance improved.

(g) Particular importance is placed on the insulation of the top area 18, since it is particularly strongly heated by the rays of the sun in summer. To this end it is provided to make the headliner of a plastic material of particularly great thermal insulation. Here, too, solutions using expanded foam or composite materials are known, however (as mentioned above in connection with the rear window shelf) without a noticeable thermal insulating effect of the total system known as the "passenger compartment".

Since the vehicle top, which in most cases is made of sheet metal, can heat up very strongly, in particular when traveling slowly or when in a traffic jam, it is furthermore provided to arrange a ventilation gap 27, or a system of passive ventilating elements, such as ventilation channels 28, for example, which are connected with the exterior space, between the thermal insulation and the inside of the sheet metal of the top. By means of this it is possible, to transport heat convectively to the outside. In this case convection can be aided by passing the slip stream through or by using a separate ventilation. Such an interior ventilation can of course also be employed in other vehicle areas. For the area of the top in particular, such passive ventilation can also be aided by active ventilating elements. In this case it is possible, for example, to use blowers, which can also be operated by solar cells which can be housed in the sliding roof or the bumpers.

(h) The thermal insulation of the door is provided in two parts in this exemplary embodiment. An outer preformed body 4 is connected with the inside of the exterior sheet metal. Since as a second effect, besides the thermal insulation, an increase in the rigidity and the energy dissipation capability during deformation (side impact protection) is also intended, two measures have been taken: for one, the preformed body is connected over its entire surface with the inside of the exterior sheet metal, for example glued to it, and then reinforcements 3, for example high-strength plastic fibers, have been worked into the preformed body 4.

An inner preformed body 4a is located on the inside of the door. A hollow space 5 for receiving the window 6 is located between the two preformed bodies. The inner preformed body 4a supports the required function and handling elements, such as guide and lifting elements for the window 6, door closing apparatus, and the like. Decorative elements 8 are provided on the side of the preformed body facing the interior. Furthermore, holders for loudspeakers and channels for cables are provided. The inner preformed body also aids in the stiffening of the door, therefore reinforcements 3 have also been provided inside the preformed body 4a.

Figure 3:
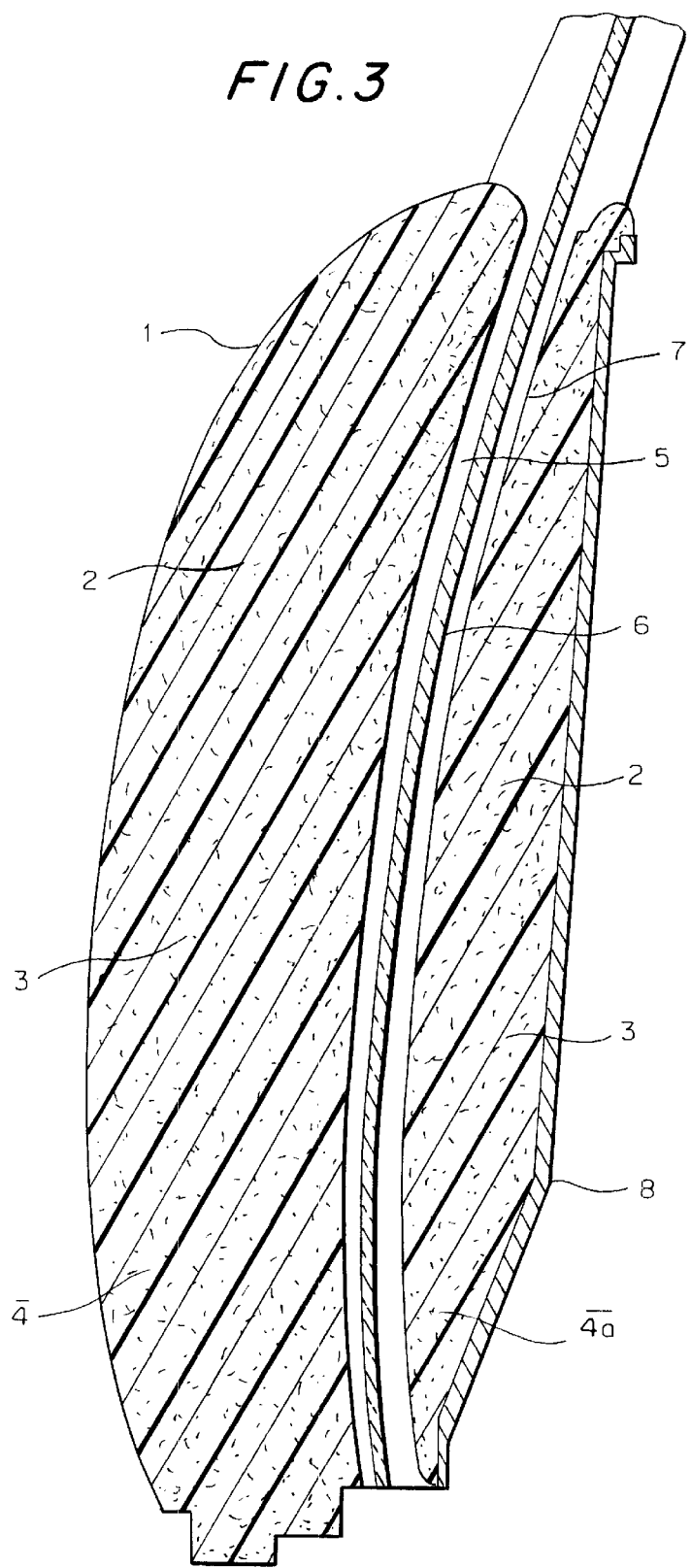
Figure 4A:
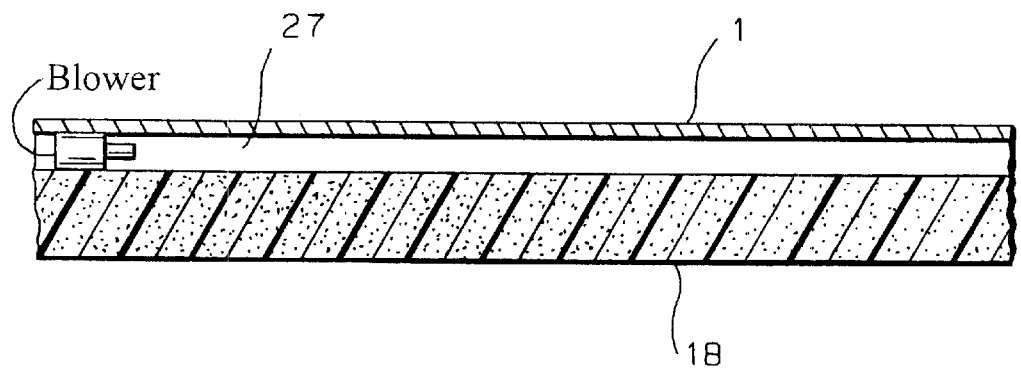
Figure 4B:
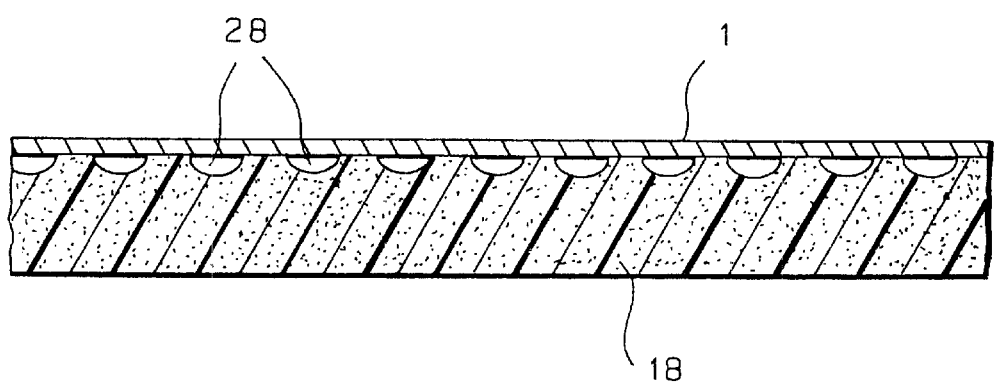
Figure 5:
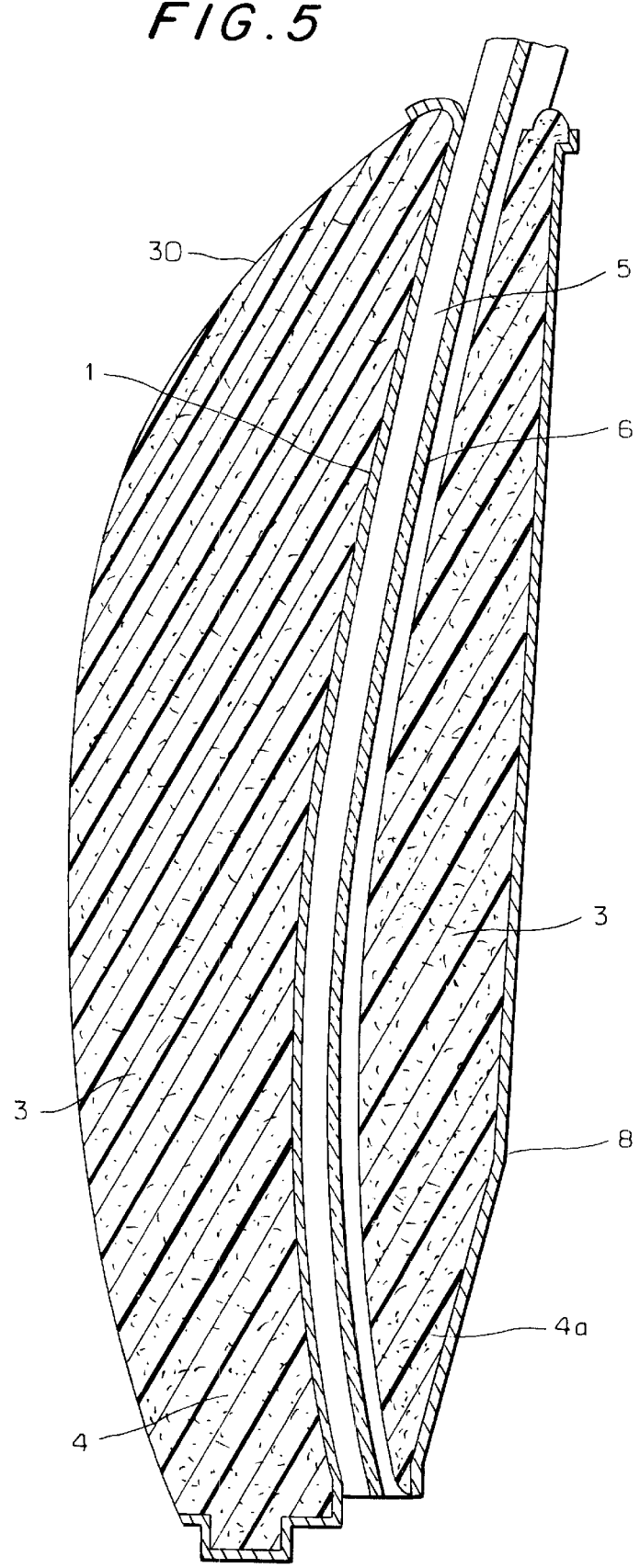
FIG. 5 is view similar to that of FIG. 3 showing a modified form of construction of the invention.

FIG. 5 shows a cross-sectional view similar to that of FIG. 3, but in which insulating body 4 is mounted directly on the outside of outer sheet metal 1 and is provided with a weather-resistant outer skin 30.

Figure 6:
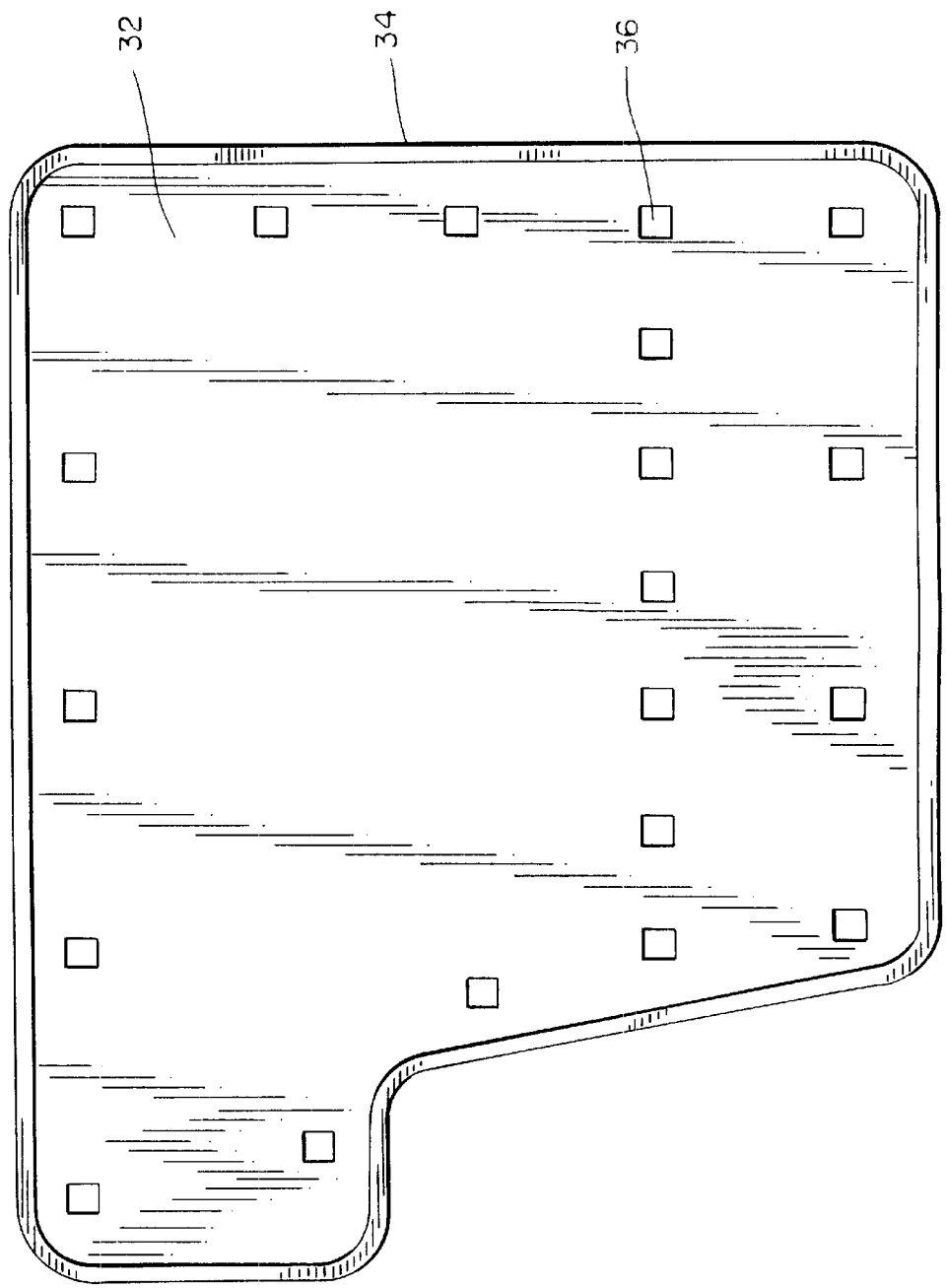
FIG. 6 is a plan view of an embodiment of an insulating body according to the invention.

FIG. 6 shows an example of an insulating body according to the invention composed of a homogeneous base material 32 provided with reinforcement elements 34 and 36. Reinforcement elements 34 and 36 may be profiles or stamped elements made of metal, or preformed elements made from renewable raw materials or high-strength plastic.

The inner preformed body takes on a total of four tasks: it is used for thermal insulation, for increasing the mechanical stability, is a component support and an interior decoration, and therefore represents a special example for the possibilities of thermal insulation in accordance with the invention.

All insulating measures recited above can of course also be employed if the body or parts thereof have been made of plastic.

What is claimed is:

1. A motor vehicle with an interior and an exterior and having hollow spaces bordering the exterior, the interior including a passenger compartment, said motor vehicle comprising a plurality of components, including components that border the passenger compartment, and elements made of thermal insulation material, at least one of said elements being constituted by a preformed body containing reinforcements that constitute means for giving said body enhanced rigidity and for enabling said at least one preformed body to serve as a support for function elements of the motor vehicle, wherein said plurality of components include an instrument panel, a floor, a rear window shelf and a roof, in each of which a respective one of said elements made of thermal insulation material is installed between the interior and the exterior and in at least one of the hollow spaces bordering the exterior; wherein said plurality of components further comprise doors and a respective one of said elements made of thermal insulation material is installed in each of said doors; and wherein said at least one of said elements made of thermal insulation material is constructed in regard to at least one of its shape, the selection of its material and its attachment in such a way that said at least one of said elements improves at least one basic function or at least one property of both its associated component and of the entire motor vehicle, with respect to at least one of mechanical stability, acoustic insulation and weight reduction.

2. The motor vehicle in accordance with claim 1, wherein the thermal insulation material consists of at least one renewable raw material or a compound or derivative of this raw material.

3. The motor vehicle in accordance with claim 1, wherein the thermal insulation material consists of a plastic.

4. The motor vehicle in accordance with claim 1, wherein the thermal insulation material comprises at least one of a composite material of synthetic materials, and renewable raw materials.

5. The motor vehicle in accordance with claim 1, wherein the motor vehicle has a trunk or a cargo compartment having interior surfaces that are provided with said elements made of thermal insulation material.

6. The motor vehicle in accordance with claim 5, wherein the motor vehicle has a ventilation system into which the trunk or cargo compartment is integrated, and wherein said ventilation system comprises a ventilation channel located in the roof between the respective element made of thermal insulation material and the vehicle exterior, said channel providing an air flow path that is isolated from the interior of the vehicle for transporting heat away from the vehicle interior.

7. The motor vehicle in accordance with claim 1, wherein in an area of the vehicle exposed to accidents said at least one preformed body is constructed to be elastic or resilient and energy absorbing.

8. The motor vehicle in accordance with claim 1, wherein said at least one preformed body has a highly stressable surface, which absorbs large pressure forces in limited surface areas and distributes the forces to other parts of the vehicle.

9. The motor vehicle in accordance with claim 1, wherein said at least one preformed body is constituted by a foam filling at least one of the hollow spaces.

10. The motor vehicle in accordance with claim 1, wherein said at least one preformed body is constituted completely by a rigid insulating body.

11. The motor vehicle in accordance with claim 1, wherein said at least one preformed body is integrated as an additional element into one of said components.

12. The motor vehicle in accordance with claim 1, wherein said at least one preformed body is directly maintained on the inside of an outer sheet metal of the motor vehicle.

13. The motor vehicle in accordance with claim 12, wherein said at least one preformed body is connected flat with the inside of the outer sheet metal.

14. The motor vehicle in accordance with claim 12, further comprising a passive ventilation system between the outer sheet metal and said at least one preformed body, said passive ventilation system constituting means for transporting heat convectively from a region between said preformed body and said outer sheet metal to the air surrounding the motor vehicle.

15. The motor vehicle in accordance with claim 14, wherein the motor vehicle has a main ventilation system and a roof that is covered by the outer sheet metal, and the passive ventilation system is integrated into the main ventilation system.

16. The motor vehicle in accordance with claim 15, wherein the passive ventilating system includes at least one air guide channel.

17. The motor vehicle in accordance with claim 1, wherein said at least one preformed body comprises a homogeneous base material and said reinforcements are reinforcement elements enclosed in said base material.

18. The motor vehicle in accordance with claim 17, wherein each reinforcement element is one of: a profile or stamped element made of metal; a preformed element made from renewable raw materials; or a preformed element of high-strength plastic.

19. The motor vehicle in accordance with claim 1, wherein said at least one preformed body provides acoustic insulation.

20. The motor vehicle in accordance with claim 1, further comprising vehicle windows made of thermally insulating glass, which, together with said elements made of thermal insulation material, provides a total thermal protection for the interior of the motor vehicle.

21. The motor vehicle in accordance with claim 1, wherein the components include doors.

22. The motor vehicle in accordance with claim 1 wherein said plurality of components further comprise doors and a respective one of said elements made of thermal insulation material is installed in each of said doors.

* * * * *